United States Patent
Tooher et al.

(10) Patent No.: US 12,149,486 B2
(45) Date of Patent: Nov. 19, 2024

(54) METHODS FOR USING IN-CARRIER GUARD BANDS

(71) Applicant: InterDigital Patent Holdings, Inc., Wilmington, DE (US)

(72) Inventors: Patrick Tooher, Montreal (CA); Aata El Hamss, Laval (CA); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 292 days.

(21) Appl. No.: 17/764,083

(22) PCT Filed: Sep. 30, 2020

(86) PCT No.: PCT/US2020/053466
§ 371 (c)(1),
(2) Date: Mar. 25, 2022

(87) PCT Pub. No.: WO2021/067391
PCT Pub. Date: Apr. 8, 2021

(65) Prior Publication Data
US 2022/0407663 A1     Dec. 22, 2022

Related U.S. Application Data

(60) Provisional application No. 62/908,809, filed on Oct. 1, 2019.

(51) Int. Cl.
*H04W 4/06* (2009.01)
*H04L 5/00* (2006.01)
*H04W 24/10* (2009.01)
*H04W 74/0816* (2024.01)

(52) U.S. Cl.
CPC .......... *H04L 5/0098* (2013.01); *H04L 5/0051* (2013.01); *H04W 24/10* (2013.01); *H04W 74/0816* (2013.01)

(58) Field of Classification Search
CPC ... H04L 5/0098; H04L 5/0051; H04L 5/0053; H04L 5/0048; H04L 5/001; H04W 24/10;
(Continued)

(56) References Cited

U.S. PATENT DOCUMENTS

2015/0011233 A1   1/2015  Kazmi et al.
2019/0281610 A1   9/2019  Choi et al.
(Continued)

FOREIGN PATENT DOCUMENTS

EP       3327977 A2      5/2018
WO    WO 2019028675 A1   2/2019

OTHER PUBLICATIONS

RP-182878, "New WID on NR-based Access to Unlicensed Spectrum", TSG RAN #82 Sorrento, Italy, Dec. 10-13, 2018.
(Continued)

*Primary Examiner* — Maharishi V Khirodhar
(74) *Attorney, Agent, or Firm* — Flaster Greenberg, P.C.

(57) ABSTRACT

A method, performed by a wireless transmit receive unit for of activating or deactivating at least one in-carrier guard band in a bandwidth part includes receiving a configuration of a set of in carrier guard bands, receiving a channel resource configuration associated with a guard band of the set of in-carrier guard bands, and receiving an indication that the guard band is activated or deactivated. On condition that the guard band of the set of in-carrier guard bands is deactivated, performing a measurement on at least one received reference signal in resources of the channel resource configuration including resources in the deactivated guard band. On condition that the guard band is activated, performing a measurement on at least one received reference signal in resources of the channel resource configuration excluding resources in the activated guard band.

20 Claims, 9 Drawing Sheets

(58) Field of Classification Search
CPC ......... H04W 74/0816; H04W 72/0453; H04W 72/23; H04W 74/0808
USPC ........................................................ 370/329
See application file for complete search history.

(56) References Cited

U.S. PATENT DOCUMENTS

2021/0392532 A1* 12/2021 Wu .................. H04W 24/08
2022/0061094 A1* 2/2022 Jung ................ H04W 74/0816
2022/0104258 A1* 3/2022 Moon ................ H04L 5/0053

OTHER PUBLICATIONS

3GPP TS 38.321, "Medium Access Control (MAC) protocol specification", v15.1.0, Mar. 2018.
3GPP TR 38.889, "Study on NR-based access to access to unlicensed spectrum", v16.0.0, Dec. 2018.
TS 138331 version 15.6 0 5G NR Radio Resource Control Protocol Specification 3GPP TS 38331 version 15 6 0 Release Jul. 15, 2019.
TS 138214 version 15.6.0 5G NR Control Protocol Specification 3GPP TS 38214 version 15 6 0 Release Jul. 15, 2019.
3GPP TS 38.213, "NR Physical layer procedures for control", v15.3.0, Sep. 2018.
Third Generation Partnership Project (3GPP), "Physical Layer Procedures for Data", Technical Specification Group Radio Access Network; NR, Release 15, 3GPP TS, Jun. 2019, 38.214 V15.6.0, 105 pages.
Third Generation Partnership Project (3GPP), "Radio Resource Control (RRC) protocol specification", Technical Specification Group Radio Access Network; NR; Release 15, 3GPP TS 38.331 V15.6.0, Jun. 2019, 519 pages.

* cited by examiner

METHODS FOR USING IN-CARRIER GUARD BANDS

CROSS REFERENCE TO RELATED APPLICATIONS

This application is a U.S. National Stage Application claims the benefit, under 35 U.S.C. § 371 of International Application PCT/US2020/053466, filed 30 Sep. 2020, which claims the benefit of U.S. provisional patent application No. 62/908,809 filed 1 Oct. 2019 which is incorporated by reference herein in its entirety.

BACKGROUND

Operation of a 5G new radio (NR) system in unlicensed spectrum (NR-U) may be subject to some limits on the transmit power control (TPC), the RF output power and power density given by the mean effective isotropic radiated power (EIRP) and the mean EIRP density at the highest power level. It may further be subject to requirements on the transmitter out of band emissions. Such may be specific to bands and/or geographical locations.

Operation may be further subject to requirements on the Nominal Channel Bandwidth (NCB) and the Occupied Channel Bandwidth (OCB) are defined for unlicensed spectrum in the 5 GHz region. The Nominal Channel Bandwidth, i.e., the widest band of frequencies inclusive of guard bands assigned to a single channel, is determined to be at least 5 MHz at all times. The Occupied Channel Bandwidth, i.e., the bandwidth containing 99% of the power of the signal, is determined to be between 80% and 100% of the declared Nominal Channel Bandwidth. During an established communication, a 5G compatible device is allowed to operate temporarily in a mode where its Occupied Channel Bandwidth may be reduced to as low as 40% of its Nominal Channel Bandwidth with a minimum of 4 MHz.

Channel access in an unlicensed frequency band typically uses a Listen-Before-Talk (LBT) mechanism. LBT is typically mandated independently of whether the channel is occupied or not.

For frame-based systems, LBT may be characterized by a Clear Channel Assessment (CCA) time (e.g., ~20 µs), a Channel Occupancy Time (e.g., minimum 1 ms, maximum 10 ms), an idle period (e.g., minimum 5% of channel occupancy time), a fixed frame period (e.g., equal to the channel occupancy time+idle period), a short control signaling transmission time (e.g., maximum duty cycle of 5% within an observation period of 50 ms), and a CCA energy detection threshold.

For load-based systems (e.g., transmit/receive structure may not be fixed in time), LBT may be characterized by a number N corresponding to the number of clear idle slots in extended CCA instead of the fixed frame period. N may be selected randomly within a range.

Deployment scenarios may include different standalone NR-based operation, different variants of dual connectivity operation. Examples include Evolved-Universal Terrestrial Radio Access-New Radio, Dual Connectivity, (EN-DC) with at least one carrier operating according to the Long Term Evolution (LTE) Radio Access Technology (RAT) or New Radio Dual Connectivity (NR DC) with at least two sets of one or more carriers operating according to the NR RAT, and/or different variants of carrier aggregation (CA) e.g., possibly also including different combinations of zero or more carriers of each of LTE and NR RATs.

For example, for LTE, the following functionalities were considered for a License Assisted Access (LAA) system: Listen-Before-Talk (LBT) Clear Channel Assessment (CCA).

The listen-before-talk (LBT) procedure is defined as a mechanism by which an equipment applies a clear channel assessment (CCA) check before using the channel. The CCA utilizes at least energy detection to determine the presence or absence of other signals on a channel in order to determine if a channel is occupied or clear, respectively. European and Japanese regulations mandate the usage of LBT in the unlicensed bands. Apart from regulatory requirements, carrier sensing via LBT is one way for fair sharing of the unlicensed spectrum and hence it is considered to be a vital feature for fair and friendly operation in the unlicensed spectrum in a single global solution framework.

Discontinuous transmission on a carrier with limited maximum transmission duration. In unlicensed spectrum, channel availability cannot always be guaranteed. In addition, certain regions such as Europe and Japan prohibit continuous transmission and impose limits on the maximum duration of a transmission burst in the unlicensed spectrum. Hence, discontinuous transmission with limited maximum transmission duration is a required functionality for LAA.

Carrier selection. As there is a large available bandwidth of unlicensed spectrum, carrier selection is required for LAA nodes to select the carriers with low interference and to select a carrier that can achieve good co-existence with other unlicensed spectrum deployments.

Transmit Power Control Transmit Power Control (TPC) is a regulatory requirement in some regions by which the transmitting device should be able to reduce the transmit power in a proportion of 3 dB or 6 dB compared to the maximum nominal transmit power. This requirement does not need new specifications.

Radio Resource Management (RRM) measurements including cell identification. RRM measurements including cell identification enable mobility between Secondary Cells (SCells) and robust operation in the unlicensed band.

Channel-State Information (CSI) measurement, including channel and interference. A User Equipment (UE) operating in an unlicensed carrier should also support the necessary frequency/time estimation and synchronization to enable RRM measurements and for successful reception of information on the unlicensed band.

UE Operation in Unlicensed Bands for NR Release 16.

The 3rd Generation Partnership Project (3GPP) supports work to define NR operation in unlicensed spectrum. One of the objectives is to specify NR-based operation in unlicensed spectrum, including initial access, scheduling and Hybrid Automatic Repeat Request (HARQ), and mobility, along with coexistence methods with LTE-LAA and other incumbent RATs. Deployment scenarios may include different standalone NR-based operation, different variants of dual connectivity operation, e.g., EN-DC with at least one carrier operating according to the LTE radio access technology (RAT) or NR DC with at least two set of one or more carriers operating according to the NR RAT, and/or different variants of carrier aggregation (CA) e.g., possibly also including different combinations of zero or more carriers of each of LTE and NR RATs.

NR-U supports 4 categories of channel access schemes for NR-U operations. Channel access categories includes immediate transmission after a short switching gap i.e. category 1 and LBT without random back-off i.e. category 2 as well as LBT with random back-off with fixed and variable contention widow size i.e. category 3 and 4 respectively.

Listen-Before-Talk (LBT) is generally performed using clear channel assessments on so-called LBT subbands of 20 MHz. A Bandwidth Part (BWP) may be a single LBT subband or may be composed of multiple LBT subbands. For the case where a BWP is composed of multiple LBT subbands, it may be used even if only a subset of the LBT subbands are acquired at any given moment.

The time for which a channel has been acquired for transmission is deemed a channel occupancy time (COT). The COT may be acquired by a UE or by a gNode B (gNB) base station and may be subsequently shared with the other node. In conventional use, the total COT duration—including any sharing—cannot exceed maximum COT.

To enable operation of BWPs composed of multiple LBT subbands, it is possible for a COT to be active on a subset of all the LBT subbands of a BWP. For example, based on the outcome of the LBT processes, a COT may be active on a just a subset of requested LBT subbands. To enable operation over diverse sets of acquired LBT subbands, in-carrier guard bands have been proposed to ensure coexistence with other nodes using different BWP sizes (e.g. single LBT subbands). In-carrier guard bands are required at the edges of the sets of acquired LBT subbands. However, given that different edges may exist based on the outcome of LBT processes, in-carrier guard bands can effectively be located at the juncture of all LBT subbands within a BWP. For efficient operation, in-carrier guard bands located at the juncture of two acquired LBT subbands should be useable for transmissions of signals and channels. Therefore, solutions are desirable to enable the transmission of channels and signals in the in-carrier guard bands in the event that they are located at the juncture of two acquired LBT subbands. For effective use, such solutions should desirably be dynamically adaptable, and are may desirably be acquired and discarded at least as fast as COTs are acquired and discarded. Furthermore, means are desirable to enable UEs to perform adequate channel measurements with respect to multiple assumptions of in-carrier guard band locations. Some of these desires are addressed by the disclosure herein.

SUMMARY

A method, performed by a wireless transmit receive unit (WTRU), of activating or deactivating at least one in-carrier guard band defined for an acquired bandwidth part includes receiving a configuration of a set of in-carrier guard bands associated with a bandwidth part, receiving a channel resource configuration associated with a guard band of the set of in-carrier guard bands, and receiving an indication that the guard band of the set of in-carrier guard bands is activated or deactivated.

On condition that the guard band of the set of in-carrier guard bands is deactivated, the WTRU performs a measurement on at least one received reference signal in resources of the channel resource configuration including resources in the deactivated guard band. On condition that the guard band of the set of in-carrier guard bands is activated, the WTRU performs a measurement on at least one received reference signal in resources of the channel resource configuration excluding resources in the activated guard band.

The method may further include optionally transmitting at least one report based on at least one activation/deactivation of at least one guard band. A WTRU may activate or deactivate the at least one in-carrier guard band, and transmit or receive information in a corresponding bandwidth part by the WTRU. Transmitting or receiving information in the bandwidth part by the WTRU occurs in a time limit of a channel occupancy time.

Further to the method, receiving a configuration of a set of in-carrier guard bands associated with a bandwidth part is determined by higher layer signaling. Receiving an indication that the guard band of the set of in-carrier guard bands is activated or deactivated, includes receiving or detecting any of: a channel occupancy time frequency structure for a set of acquired subbands, an information element in a physical downlink control channel, a physical downlink control channel, downlink control information (DCI), a medium access control—control element, an information element in a physical downlink shared channel, a physical downlink shared channel, a resource allocation (RA) of a scheduling assignment or grant, a RA mapping to a physical resource block, and a post hoc message that changes a resource allocation, RA, for the configured bandwidth part.

In an example of the method, the WTRU may receive information relating to a deactivation of at least one in-carrier guard band between adjacent subbands in the bandwidth part, deactivate the at least one in-carrier guard band, and transmit or receive information in the adjacent subbands by the WTRU within a time limit of a channel occupancy time.

Further to the method, the WTRU may receive a configuration of a set of in-carrier guard bands associated with a bandwidth part that includes receiving information regarding any of: a size of a guard band of the set of in-carrier guard bands, a position or location of the guard band, an indication of the guard band being either statically configured, dynamically configured, activated, or deactivated, a presence of the guard band within a channel occupancy time, a trigger for activation or deactivation of the guard band, and a beam identifier.

Further to the method, the WTRU may receive a channel resource configuration associated with a guard band of the set of in-carrier guard bands may include receiving a channel state information reference signal resource configuration.

In one embodiment, a computer readable storage medium comprising instructions which when executed by a computer cause the computer to carry out any of the method steps undertaken by the WTRU.

In one embodiment, a WRTU, includes a transceiver to: receive a configuration of a set of in-carrier guard bands associated with a bandwidth part, receive a channel resource configuration associated with a guard band of the set of in-carrier guard bands, and receive an indication that the guard band of the set of in-carrier guard bands is activated or deactivated. In the embodiment, a processor is configured to perform, on condition that the guard band of the set of in-carrier guard bands is deactivated, a measurement on at least one received reference signal in resources of the channel resource configuration including resources in the deactivated guard band. The processor is also configured to perform, on condition that the guard band of the set of in-carrier guard bands is activated, a measurement on at least one received reference signal in resources of the channel resource configuration excluding resources in the activated guard band.

In one embodiment, the processor is further configured to transmit at least one report based on at least one activation/deactivation of at least one guard band of the set of in-carrier guard bands. The processor is further configured to activate or deactivate the at least one guard band, and the transceiver is further configured to transmit or receive information in the bandwidth part. The transceiver transmits or receives information in the bandwidth in a time limit of a channel occupancy time.

In an aspect of a WTRU embodiment, the transceiver-received configuration of a set of in-carrier guard bands associated with a bandwidth part is determined by higher layer signaling.

In an aspect of a WTRU embodiment, the transceiver-received indication that the guard band of the set of in-carrier guard bands is activated or deactivated includes the transceiver receiving or the WTRU detecting any of: a channel occupancy time frequency structure for a set of acquired subbands, an information element in a physical downlink control channel, a physical downlink control channel, a downlink control information element, a medium access control—control element, an information element in a physical downlink shared channel, a physical downlink shared channel, a RA of a scheduling assignment or grant, a RA mapping to a physical resource block, or a post hoc message that changes a RA for the configured bandwidth part. In one aspect, receiving a post hoc message that changes the RA of the configured bandwidth part subsequently enables demodulation of information previously received in the configured bandwidth part before reception of the post hoc message.

In an aspect of a WTRU embodiment, the transceiver is further configured to receive information relating to a deactivation of at least one in-carrier guard band between adjacent subbands in the bandwidth part. The processor is further configured to deactivate the at least one guard band in the set of in-carrier guard bands. The transceiver is further configured to transmit or receive information in the adjacent subbands within a time limit of the COT. The transceiver-received configuration of a set of in-carrier guard bands associated with a bandwidth part may include any of: a size of a guard band in the set of in-carrier guard bands, a position or location of the guard band, an indication of the guard band being statically configured, dynamically configured, activated or deactivated, a presence of the in-carrier guard band within the channel occupancy time, a trigger for activation or deactivation, or a beam identifier.

In one example of a WTRU embodiment, the transceiver is configured to receive a channel resource configuration associated with a guard band of the set of in-carrier guard bands includes the transceiver configured to receive a channel state information reference signal resource configuration.

Although various embodiments are described and/or claimed herein in which an apparatus, system, device, etc. and/or any element thereof carries out an operation, process, algorithm, function, etc. and/or any portion thereof, it is be understood that any embodiments described and/or claimed herein assume that any apparatus, system, device, etc. and/or any element thereof is configured to carry out any operation, process, algorithm, function, etc. and/or any portion thereof.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref") in the Figures indicate like elements, and wherein.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application. In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Figure 1A:
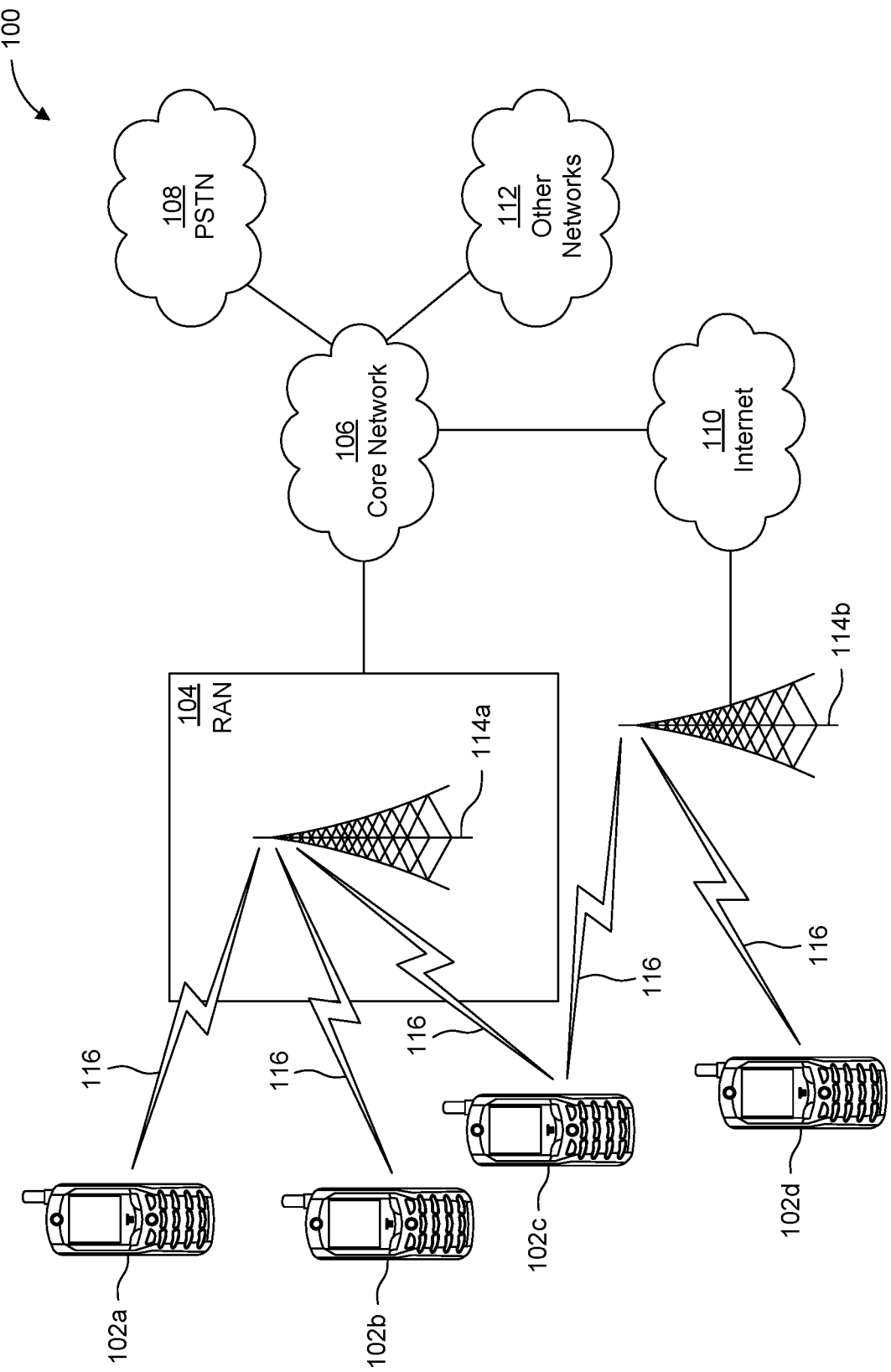
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
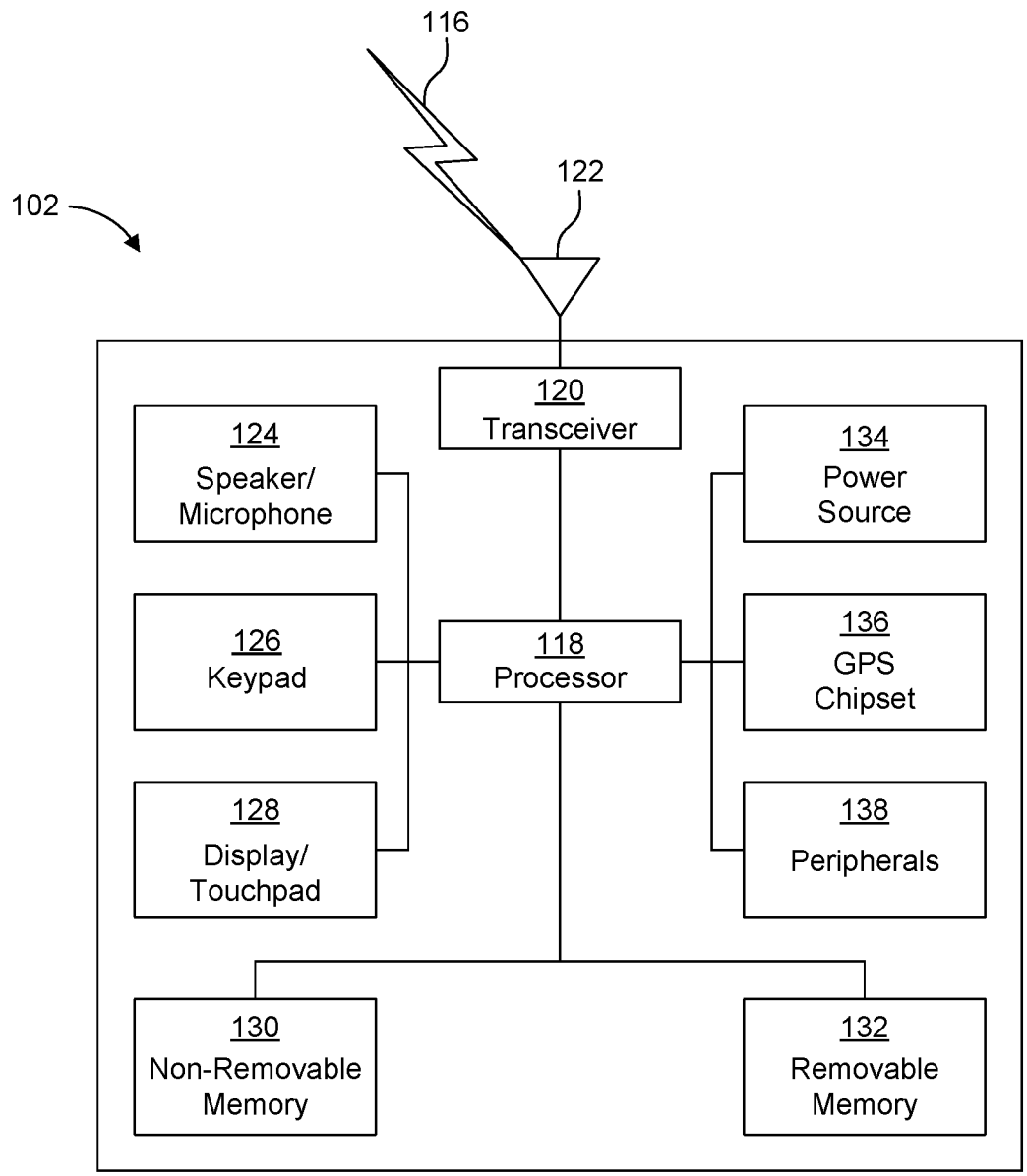
FIG. 1B is a system diagram illustrating an example WTRU that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
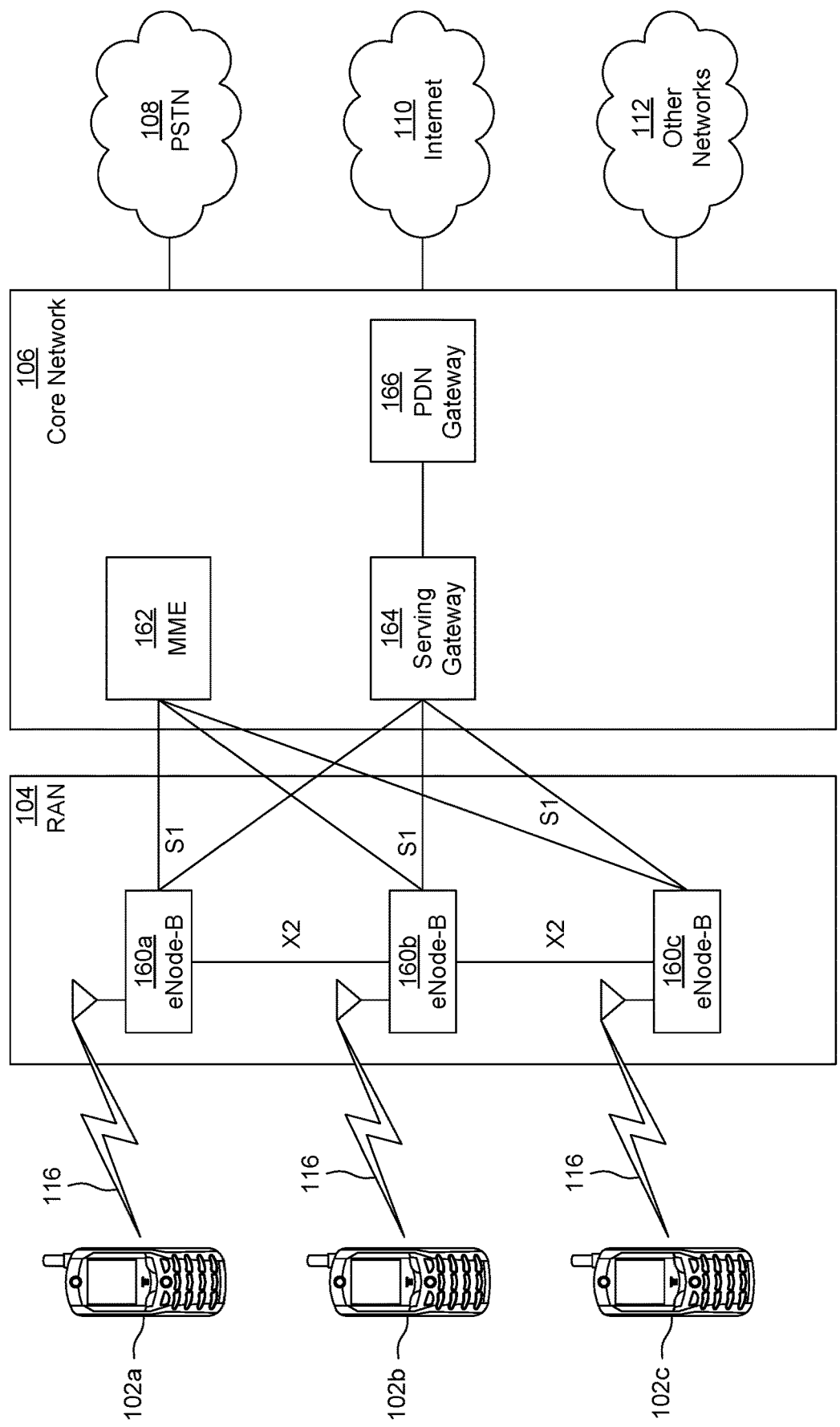
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
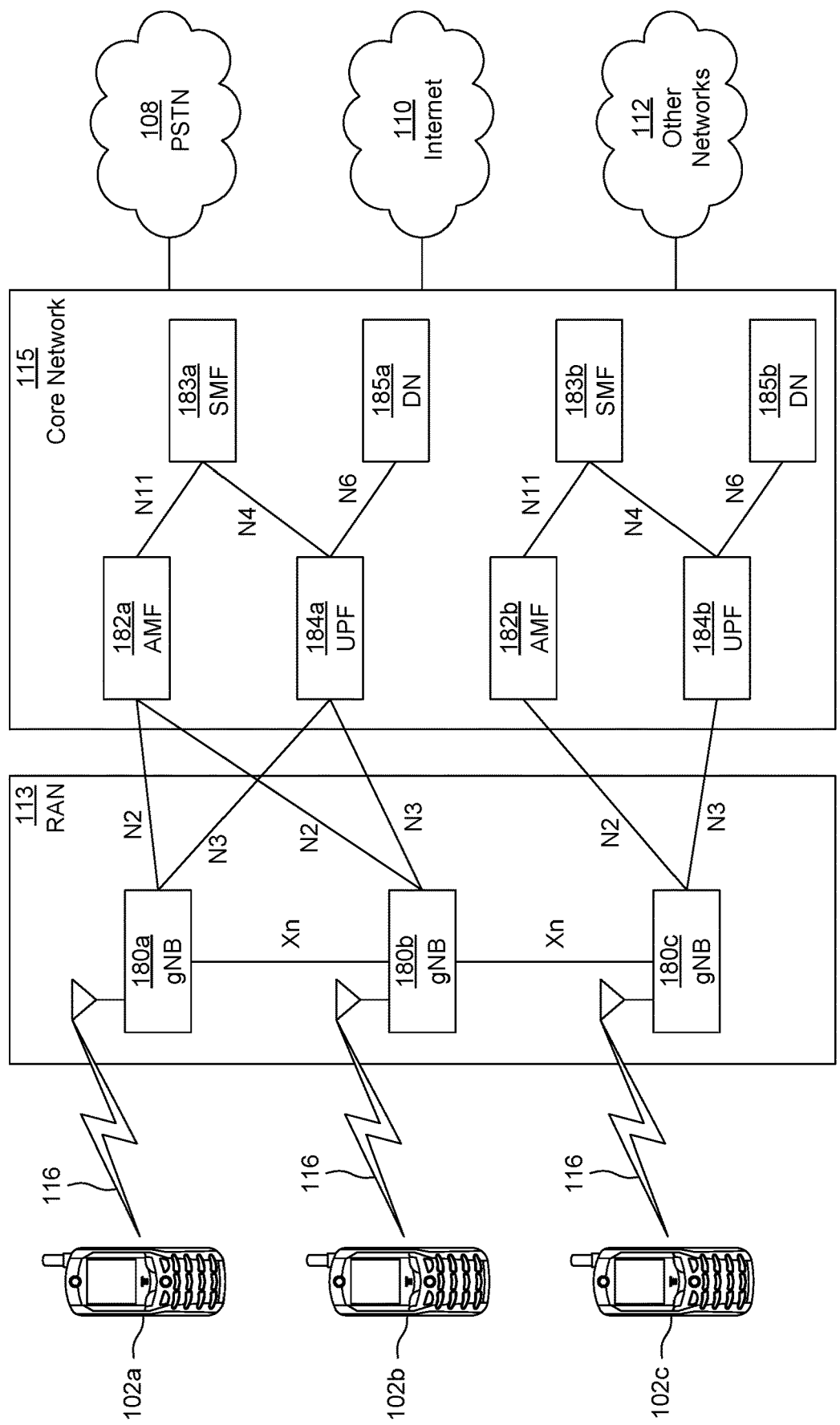
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of (non-access stratum) (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU/UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Examples provided herein do not limit applicability of the subject matter to other wireless technologies, e.g., using the same or different principles as may be applicable.

As explained herein, a wireless transmit receive unit (WTRU) may be an example of a user equipment (UE). Hence the terms UE and WTRU may be used in equal scope herein.

Configuration of In-Carrier Guard Bands. As used herein below, an in-carrier guard band may be referred to simply with the term "guard band" as an interchangeable alternative to the term "in-carrier guard band". As described above, in-carrier guard bands may be those guard bands which separate subbands, for example in a BWP. A WTRU may be configured to transmit or receive over resources defined by a resource allocation. The resource allocation may include a first resource for transmission or reception of synchronization or reference signals (such as Synchronization Signal (SS), Channel State Information Reference Signal (CSI-RS), Synchronization Reference Signal (SRS), Positioning Reference Signal (PRS)) or physical channels (such as Physical Downlink Shared Channel (PDSCH), Physical Uplink Shared Channel (PUSCH), Physical Random Access Channel (PRACH), Physical Broadcast Channel (PBCH)), and a second resource corresponding to at least one guard band. A WTRU may not transmit or receive a signal or channel on the second resource. In another example, the second resource may be used for transmission or reception of peak reduction tones (PRTs). For the remainder of this application, a guard band may be used to refer to any set of resources on which the WTRU is not expected to receive or transmit reference signals or physical channels for control or data. The configuration of an in-carrier guard band may include at least one of the following parameters:

- Size of the guard band. This may be defined in terms of Physical Resource Blocks (PRBs), subcarriers, or bandwidth.
- Position or location of the guard band. This may be defined as an absolute frequency position, as a position with respect to another (e.g. pre-configured) frequency position (e.g. a parameter of the component carrier), or as a resource index (PRB or subcarrier resource). For example, the configuration of an in-carrier guard band may be performed via a bitmap indicating the set of PRBs within a BWP (Bandwidth Part) where it may be located.
- Whether the guard band is semi-statically configured or whether it can be dynamically activated/deactivated. When a guard band is activated, the WTRU may not expect any signal or channel uplink (UL) or downlink (DL) to be located in the resources configured for the guard band. This may require the WTRU to assume puncturing or rate matching is performed around the resources assigned to the in-carrier guard band. When a guard band is deactivated, a WTRU may be able to receive and/or transmit a signal or channel in the resources previously configured for the guard band.
- The presence of the guard band within a COT. An in-carrier guard band may be activated in some time instances of a COT and deactivated in other time instances. For example, an in-carrier guard band may be activated for the first slot(s) of a COT and deactivated for the remaining slots of the COT.
- Activation/deactivation triggers. Such triggers are described further below herein.
- A beam ID. For example, an in-carrier guard band may be configured for one, or more, beams.
- What to transmit or expect to receive in an in-carrier guard band. For example, a WTRU may be configured with guard bands on which it may refrain from transmitting any physical channels/signals or receiving any physical channels/signals. In another example, a WTRU may be configured to transmit a signal or receive a signal on resources of an in-carrier guard band. Such a signal may include peak reduction tones (PRTs). Such PRTs may be transmitted for the purpose of reducing the peak-to-average ratio of the transmission.

In-carrier guard bands may be configured explicitly, e.g. via semi-static signaling. Such guard bands may be configured regardless of whether they fall within an active BWP of a WTRU. In another embodiment, a set of in-carrier guard bands may be configured as part of a BWP configuration.

In yet another embodiment, the in-carrier guard bands may be configured via the configuration of LBT subbands. A WTRU may be configured with a set of LBT subbands (possibly in a BWP) and the in-carrier guard bands may be configured to straddle the boundaries of two adjacent LBT subbands. In such a configuration, the WTRU may determine that half the resources of a guard band fit in a first LBT subband and the other half fit in the neighboring LBT subband. The WTRU may determine the parameters of the guard band as a function of the parameters of the LBT subbands. For example, the location of the guard bands may be at the edges of the LBT subbands and may thus depend on the size of the LBT subbands. Although the example of LBT for unlicensed bandwidth is described herein, the concepts of configuring guard bands in a set of in-carrier guard bands of a bandwidth part is readily applicable to licensed spectrum as well and as such is not limited to conditions where LBT scenarios are used. LBT scenarios are used herein as an example only and other embodiments for application in licensed, non LBT spectrum, use are considered included herein.

In-carrier guard bands may be configured to be semi-statically configured and activated or deactivated. For example, an RRC configuration may indicate (provide information about, define) to the WTRU the set of guard bands that the WTRU may assume to be active until further RRC signaling. In another embodiment, guard bands may be semi-statically configured but may be dynamically activated or deactivated.

A WTRU may be configured with varying LBT subband sizes to enable a wideband LBT. For example, a wideband LBT process may be performed over a set of adjacent LBT subbands, where an LBT subband may be defined as the smallest bandwidth portion over which an LBT process may be performed. Based on the actual bandwidth of an LBT process (e.g. determined as a set of adjacent LBT subbands), the WTRU may determine the location of the in-carrier guard bands. For example, the guard bands may be located at the edges of the sets of adjacent LBT subbands where the LBT process may be performed.

PRB Indexing may be used as part of guard band configuration.

In some embodiments, it may be desirable to make the guard band bandwidth more granular than can be obtained in a PRB level. This may be especially relevant when large subcarrier spacing (SCS) is used. In such a case, the guard band may be defined with a bandwidth in terms of subcarriers or frequency range. For such a case, the WTRU may assume that the BWP frequency resources remain fixed, regardless of guard band configuration. For example, the WTRU may assume that the resource block (RB) indexing remains fixed regardless of the guard band locations. And furthermore, the guard band may partially overlap with at least one PRB. The WTRU may assume that the partially overlapped PRB is useable (e.g. may be used for transmission or reception of a signal or channel) at least on the subcarriers not covered by the guard band. Such partial PRB may require enhanced resource assignment to be used (e.g. sub-PRB resource assignment). In another embodiment, a WTRU may assume that any assignment for the partially covered PRBs is only applicable to the subcarriers not covered by the guard band.

In another embodiment, upon being configured with a set of guard bands, the WTRU may assume a new PRB indexing scheme that is shifted to accommodate the in-carrier guard bands. Such a shift may ensure that the frequency span of a PRB only begins or ends at the edge of an in-carrier guard band.

Scheduling over in-carrier guard bands.

In some embodiments, in-carrier guard bands may be activated or deactivated dynamically. The activation or deactivation of any guard band may be indicated (provided information about, defined) by either the WTRU itself or a base station, such as controlling gNB. This may be beneficial for the case where the set of active LBT subbands may change dynamically (e.g. each COT may be composed of a different set of LBT subbands).

Activation/Deactivation as determined by COT structure is one method for scheduling over in-carrier subbands. Such an activation and/or deactivation may be determined from an information element in a Physical Downlink Control Channel (PDCCH). For example, the WTRU may detect a PDCCH (possibly a Group Common PDCCH (GC-PDCCH)) providing an indication for the set of guard bands that are activated or deactivated for the time resources of a COT. Either an information element of a PDDCH or the detection of a PDCCH by a WTRU may indicate that a guard band of a set of in-carrier guard bands may be activated/deactivated. For example, channel detection of a PDCCH rather than after decoding and reading an information element within the channel may be used as an indicator that a guard band may be activated or deactivated. In another example, the GC-PDCCH and/or COT structure indication may provide an update of the set of deactivated guard bands, e.g. at any time within a COT. This may enable the support of a varying number of active LBT subbands within a COT and activated/deactivated guard bands.

An activation and/or deactivation trigger or command may indicate to the WTRU at least one configuration associated with the activated/deactivated in-carrier guard band. For example, an in-carrier guard band activation or deactivation may enable the WTRU to determine whether to refrain from transmitting or receiving a physical channel/signal in the in-carrier guard band, or whether to use the resources of the in-carrier guard band for the transmission or reception of a physical channel/signal or of a PRT.

The set of activated or deactivated guard bands may not remain static over the duration of the COT. For example, the WTRU may determine or may be indicated that for a first set of time resources of the COT, a first set of guard bands are activated, and a second set of guard bands are deactivated. Furthermore, the WTRU may be indicated that for a second set of time resources of the COT, a third set of guard bands are activated, and a fourth set of guard bands are deactivated.

The indication in a GC-PDCCH may be implicit. For example, the WTRU may be indicated a set of acquired LBT subbands and may thus determine that a guard band is deactivated if it is located at the juncture of two LBT subbands that are acquired.

In another embodiment, the WTRU may determine the set of activated or deactivated guard bands as a function of the set of LBT subbands of a COT and of the timing of the COT.

For example, the WTRU may assume that all guard bands in the BWP are activated at the beginning of a COT and for a, possibly fixed, duration (e.g. regardless of the set of LBT subbands acquired by the gNB or WTRU for the COT). In this example, the guard bands may be assumed all activated for the first n slots or mini slots of a COT. This may reduce any ambiguity that may exist at the beginning of the COT with respect to the actual set of acquired LBT subbands. Upon reception of the COT frequency structure (i.e. the set of acquired LBT subbands), the WTRU may deactivate a set of in-carrier guard bands, possibly with a time offset from the reception of the COT frequency structure.

Figure 2:
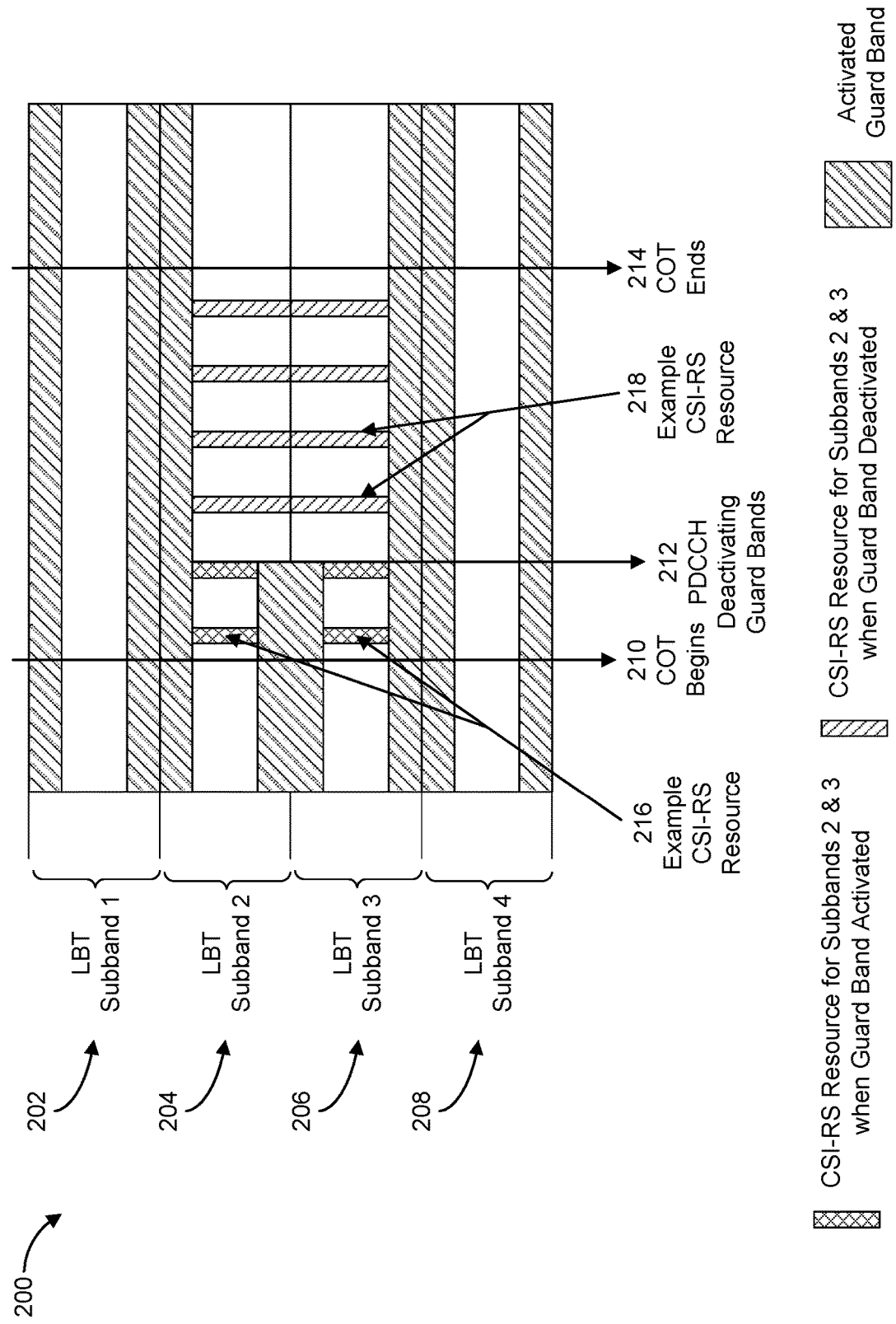
FIG. 2 depicts an example deactivation of an in-carrier guard band according to principles of the disclosure.

FIG. 2 depicts an example 200 of deactivation of guard bands. In FIG. 2, reference designation 202 is LBT subband 1, 204 is LBT subband 2, 206 is LBT subband 3, and 208 is LBT subband 4. The resources acquired by a gNB for the WTRU are in 204 subband 2 and 206 subband 3 for a COT duration. The acquired resources are located in the COT that begins at time point 210 and ends at 214. The resources of 202 subband 1 and 208 subband 4 are not acquired for use by the gNB or WTRU. In the example 200, each subband initially has active guard bands at the edges of each of the subbands as shown. In the example of FIG. 2, guard bands remain active at time point 210, the beginning of a COT, until at time point 212 when a GC-PDCCH indicates (provides information about, defines) the set of guard bands that can be deactivated for the remainder of the COT. In one option, the GC-PDCCH may also indicate that the set of deactivated guard bands are to be re-activated at a future, and possibly indicated, time (e.g. the end of the COT). In another option, the WTRU may determine the time to re-activate a set of deactivated guard bands as a function of reception of another signal (e.g. a subsequent GC-PDCCH) or of time (e.g. slot number or time since deactivation). In the FIG. 2 example, the guard bands between 204 subbands 2 and 206 subbands 3 are deactivated by action of a GC-PDCCH received at 212. This allows the concurrent use of subband 2 and 3 (for transmission or reception of channels or signals) by the WTRU or gNB for the duration of the COT. In one possible embodiment shown in FIG. 2, after the COT ends, the guard bands remain deactivated in the view of the WTRU using the subbands. But, since the COT has ended at 214, another entity (such as another WTRU) may gain control of the subbands 2 and 3 (204 and 206) and establish/configure guard bands for its own purpose. In the reactivation option indicated above, after the COT ends, some or all guard bands may be re-activated due to the action of a received GC-PDCCH re-activation instruction at 212. This option is not specifically depicted in FIG. 2, but such re-activation of deactivated guard bands may occur. Shown in FIG. 2 are example channel measurement resources 216 and 218. Example measurement resource 216 occurs for subbands 2 and 3 when a guard band is active. Example measurement resources 218 may occur when a guard band is deactivated. In the specific example of FIG. 2 the measurement resources are CSI-RS. However, in other system topologies, other reference signals may be used such as Demodulation Reference Signal (DM-RS), Phase Tracking Reference Signal (PT-RS), Sounding Reference Signal (SRS), and the like.

In some embodiments, wideband LBT may be used. Furthermore, the bandwidth of the wideband LBT may vary dynamically. In such cases, the WTRU may determine that any guard band that is wholly located within a wideband LBT bandwidth may be considered deactivated for the duration of the COT acquired using such wideband LBT process.

Activation/Deactivation may be indicated dynamically. In another embodiment, the WTRU may determine the set of activated or deactivated guard bands dynamically. For example, activation or deactivation of guard bands may occur using Downlink Control Information (DCI) or Medium Access Control—Control Element (MAC-CE). A MAC CE may be used for MAC layer control signaling between an eNB and a WTRU. In a DCI example, the DCI scheduling a Physical Downlink Shared Channel (PDSCH) or Physical Uplink Shared Channel (PUSCH) may include an information element indicating whether some, or all, configured guard bands are activated or deactivated. An information element received by a WTRU in a channel or the detection of a channel itself may indicate that a guard band of a set of in-carrier guard bands may be activated/deactivated. For example, channel detection of a PDCCH or PDSCH itself rather than an information element within the channel may be used as an indicator that a guard band may be activated or deactivated.

In another example, the WTRU may receive a DCI (e.g. a dedicated DCI) indicating the set of guard bands that are activated or deactivated for any upcoming transmission for a specific duration of time, e.g. for all upcoming transmissions within a current COT. Upon expiration of the duration of time for which the DCI indication is valid, the WTRU may assume that all guard bands are activated.

Activation/Deactivation may be indicated post hoc. A WTRU may receive an indication of the set of activated or deactivated guard bands, after the reception of a transmission. For example, a WTRU may be assigned resources for a transmission in a first time instance. The WTRU may attempt to decode the transmission using a first assumption of a set of activated and deactivated guard bands. The WTRU may continue to monitor for an indication of the actual set of activated/deactivated guard bands. For example, the WTRU may continue to monitor for such an indication if the decoding failed shortly after reception of a transmission after establishment of a COT. Upon receiving the indication of, for example, deactivated guard bands, the WTRU may update its decoding of the received transmission.

The post hoc indication of activated/deactivated guard bands may also indicate a time instance from which and for which the indication is applicable. For example, a WTRU may receive multiple transmissions prior to receiving the post hoc indication, and the post hoc indication may provide the set of time instances (or transmissions) for which the indication is valid.

The post hoc indication may be a dedicated signal for the WTRU. In another embodiment, the post hoc indication may be a group common transmission. For example, an update of the COT structure indication within a COT may provide an indication of the set of activated and deactivated guard bands that is applicable from a specific time within the COT, e.g. from the beginning of the current COT.

For the case where the WTRU receives a post hoc indication changing the WTRU's assumption of activated and deactivated guard bands, the WTRU may reinterpret the RA. As such, the Resource Allocation (RA) provided within an assignment or grant may be considered a conditional RA, subject to further refinement based on the possible reception of a post hoc indication.

Figure 3:
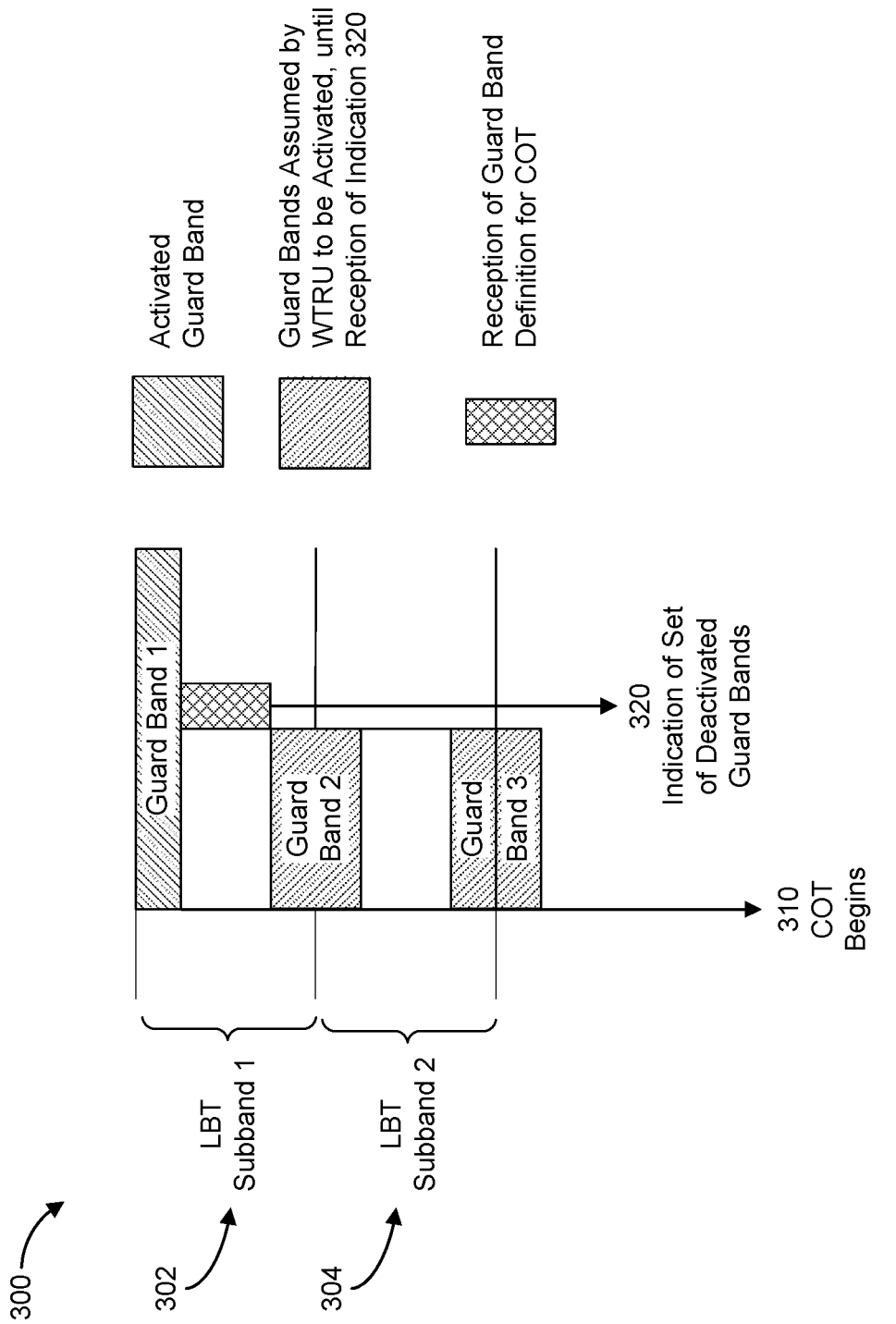
FIG. 3 depicts an example post hoc indication of deactivated in-carrier guard bands according to principles of the disclosure.

FIG. 3 shows an example of a WTRU receiving a transmission in a first time instance with a set of guard bands assumed to all be activated. In the example, reference designation 302 denotes LBT subband 1 and 304 denotes LBT subband 2, each having assumed activated guard bands labeled Guard band 1, Guard band 2 and Guard band 3. In the FIG. 3 example, in the beginning of the COT at time point 310, the WTRU assumes that guard bands 1, 2, and 3 are all activated and therefore unused for PDSCH transmission. Upon reception of the indication 320 of the set of deactivated guard bands, the WTRU may re-attempt to decode a transmission received prior to the indication (with guard bands 2 and 3 actually deactivated).

Activation/deactivation may be a function of a parameter of an assignment or grant of unlicensed spectrum.

A WTRU may determine the set of deactivated guard bands as a function of the resource allocation (RA) of a scheduling assignment or grant of subbands in unlicensed spectrum. In a first example, if an RA includes resources from two adjacent LBT subbands, the WTRU may assume that any guard band located at their juncture is deactivated. In another example, the WTRU may assume that if a PRB is scheduled, then any guard band that overlaps, or partially overlaps, that PRB is deactivated. In another example, the RA type used may indicate if the WTRU should assume some (or all) guard bands are to remain activated for the duration of the transmission.

In yet another example, different RAs may indicate different sets of activated and deactivated guard bands. For example, a first RA may indicate a first set of activated/deactivated guard bands and a second RA may indicate a second set of activated/deactivated guard bands.

Interpretation of the RA may be a function of the set of activated guard bands. A WTRU may interpret an RA mapping to PRBs regardless of the sets of activated or deactivated guard bands. For example, if the RA points to a PRB covered by an activated guard band, the WTRU can assume puncturing or rate matching is used.

In some embodiments, the set of activated PRBs may remain unchanged regardless of the RA of a scheduling assignment or grant. In such a situation, the WTRU may interpret the RA of the grant or assignment depending on the set of activated or deactivated guard bands. For example, an RA may include a starting PRB and a total number of PRB. The WTRU may consider only PRBs that are not overlapped by the activated guard bands when determining the actual mapping of the transmission to physical resources. In another example, the RA may be composed of a bitmap, the linkage of bitmap points to PRBs may be determined as a function of the activated guard bands. For example, only PRBs that are not covered, or fully covered or partially covered, by activated guard bands may be considered in the RA bitmap.

The Transport Block Size (TBS) may be determined as a function of the total number of PRBs and whether or not a PRB is partially covered by an activated guard band. For example, the function to determine the TBS may take into account the actual number of usable subcarriers in a PRB that is partially covered by an activated guard band.

Figure 4:
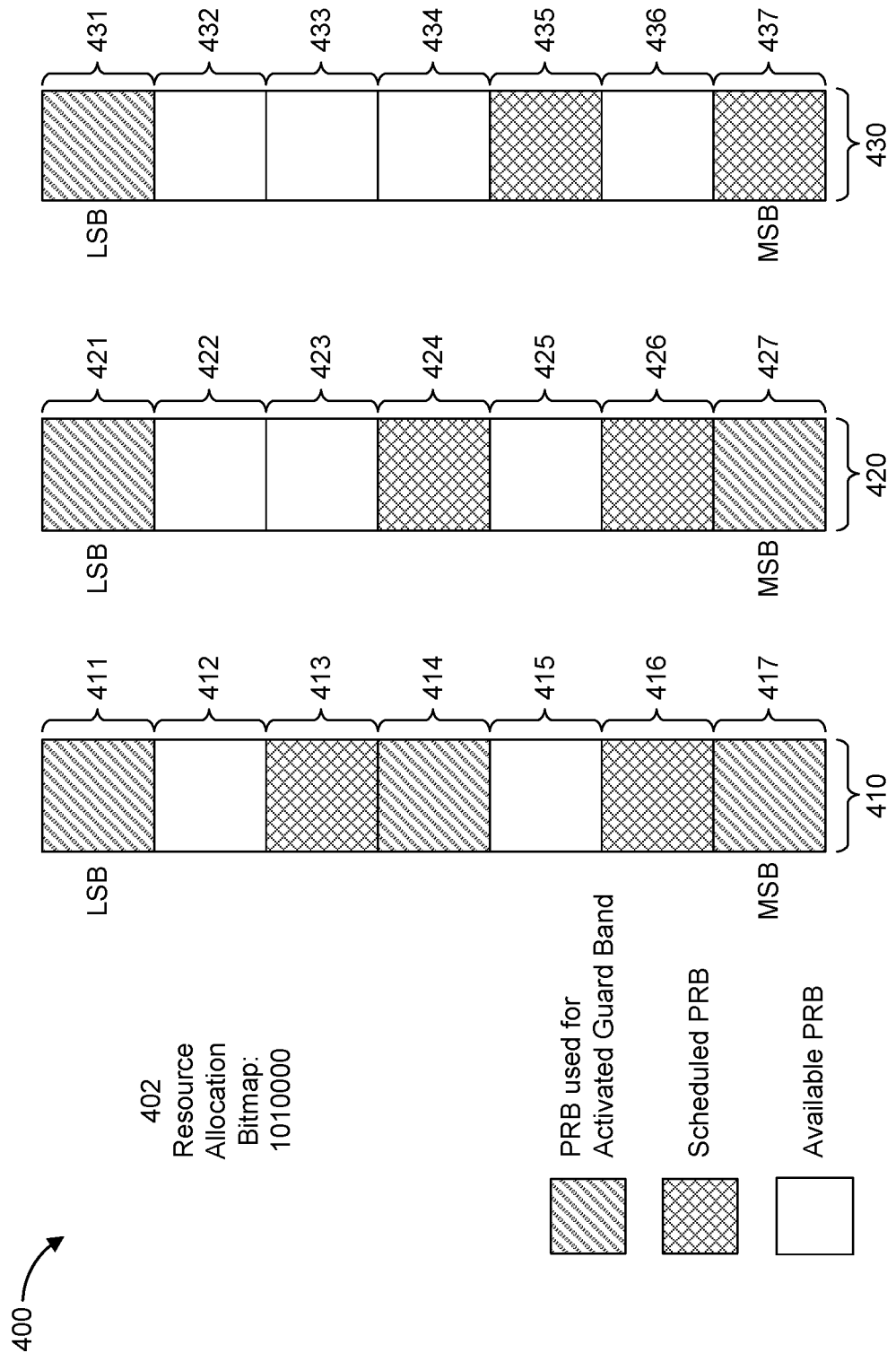
FIG. 4 depicts an interpretation of the resource allocation as a function of a set of activated or deactivated in-carrier guard bands.

FIG. 4 shows an example 400 where a single RA (resource allocation) bitmap 402 for a DL assignment or UL grant in conjunction with the set of activated/deactivated in-carrier guard bands (e.g. activated/deactivated at the time of the transmission or reception) may enable a WTRU to determine the resources used for a transmission (or reception). FIG. 4 shows an example 400 where the RA bitmap 402 of 1010000 may lead to a different resource assignment depending on the set of activated or deactivated guard bands. In the example 400, the RA bitmap 402 is for PRBs indexed from lowest (lowest significant bit, LSB) to highest (most significant bit, MSB) value (or in the figure from top LSB to bottom MSB). In this example 400, a 1 in the RA bitmap may mean that the WTRU may transmit (or expect to receive a transmission) in the PRB and a 0 in the RA bitmap may mean that the WTRU may not transmit (or may not expect to receive a transmission) in the PRB. If there are no in-carrier guard bands, the RA bitmap to PRB mapping may be one-to-one: the position of a bit in the bitmap being associated to a fixed PRB. For the case where there are in-carrier guard bands that may be active, the RA bitmap to PRB mapping may depend on the locations of the activated in-carrier guard bands. In the first example mapping 410 of PRBs, the WTRU assumes that the operational bandwidth is covered by three already activated guard bands (each of a single PRB labeled 411, 414, and 417). The mapping is therefore assumed to be relevant only to the 4 unused PRBs (416, 415, 413, and 412). As such, the bitmap of the RA's last 3 bit designations (values) are assumed unused. Furthermore, the first 4 bits of the bitmap (1010) may map only to the PRBs that are not overlapping with activated in-carrier guard bands (namely PRBs 416,415, 413, and 412) where indexing is done from bottom PRB (MSB) to top (LSB). In the mapping 410 using the RA bitmap value of 10100000, PRB 416 and 413 may be determined by the WTRU to be the PRBs on which the scheduling is relevant. In the second example mapping of PRBs 420 only the band edge guard bands 427 and 421 are activated. In this example the RA does not use the last 2 bitmap values). Furthermore, the first 5 bits of the bitmap may map only to the PRBs that are not overlapping with activated in-carrier guard bands (namely PRBs 426, 425, 424, 423, and 422). In the mapping 420 using the RA bitmap value of 10100000, PRB 426 and 424 may be determined by the WTRU to be the PRBs on which the scheduling is relevant. In the third example mapping of PRBs 430, a single guard band 431 is activated at the upper limit of the operational bandwidth. In this example, only the last value of the RA bitmap is unused. Furthermore, the first 6 bits of the bitmap may map only to the PRBs that are not overlapping with activated in-carrier guard bands (namely PRBs 437, 436, 435, 434, 433, and 432). In the mapping 430 using the RA bitmap value of 10100000, PRB 437 and 435 may be determined by the WTRU to be the PRBs on which the scheduling is relevant.

Effect of Uplink Resource Allocation.

A WTRU may be scheduled for an UL transmission using interlacing. The WTRU may determine whether to transmit a PRB of an interlace based on whether it is overlapped by an activated guard band. In another embodiment, the WTRU may shift the PRB of an interlace such that it is not overlapped by an activated guard band. The shifting may be only for that PRB of the interlace, or it may be for all other PRBs with index greater than that of the shifted PRB. For example, a WTRU may be scheduled to transmit on an interlace with PRBs 0, 10, 20, 30, 40 50. In this example, assume that in-carrier guard bands occur on PRBs 10 and 31. Therefore, using the single PRB shifting method, the WTRU may determine that the UL transmission requires a shift at PRB 10. In this example, the WTRU may transmit on PRBs 0, 11, 20, 30, 40, 50. Using the second shifting method presented above, the WTRU may determine that the UL transmission requires a shift starting at PRB 10 and another starting at PRB 31. In this example, the WTRU may transmit on PRBs 0, 11, 21, 32, 42, 52.

The WTRU may determine the set of deactivated guard bands based on the scheduled UL interlace. For example, the WTRU may assume that the gNB only schedules the WTRU on interlaces for which all overlapping guard bands are deactivated.

Effect of Guard Bands on configured grant transmissions.

A WTRU may be configured with resources on which to perform configured grant UL transmissions. Such configuration may include time, frequency and interlace resources. For such resources, the WTRU may assume that all guard bands are activated. In another embodiment, if the configured grant resources occur within an active COT, the WTRU may assume the sets of activated and deactivated guard bands for the configured grant transmission is the same as that of the ongoing COT.

If a configured grant occurs outside of a gNB acquired COT, the WTRU may attempt to acquire a COT prior to the transmission of the configured grant. The WTRU may perform LBT at least on the LBT subbands where a configured grant is configured. Based on the outcome of the LBT process(es), the WTRU may obtain a set of LBT subbands. In such a case, the WTRU may determine to deactivate any guard bands that occur at the juncture of two acquired LBT subbands. In a signal or channel (e.g. a signal or channel associated with the resources of the configured grant), the WTRU may indicate to the gNB the set of acquired LBT subbands, possibly along with the set of deactivated (or activated) guard bands assumed for the transmission of the configured grant. This may enable appropriate sharing of the WTRU acquired COT.

Feedback for Transmissions Overlapping Guard Bands.

A WTRU may attempt decoding of a DL transmission based on an assumption of sets of activated and deactivated guard bands. In some cases, the WTRU's assumption on the sets of activated and deactivated guard bands may be incorrect. For example, there may be ambiguity at the beginning of a gNB acquired COT, or there may be ambiguity if the WTRU fails to receive an indication of the sets of activated/deactivated guard bands. Therefore, for cases where the WTRU is not able to correctly decode a transport block, it may feedback its activated/deactivated sets of guard band assumptions to the gNB along with a NACK. This assumption may enable the network to properly encode a future TBS for retransmission enabling the WTRU to use incremental redundancy or combining.

Reception of Reference Signals (RS).

Any of the following embodiments may not be limited to Channel State Information-Reference Signal (CSI-RS) and may be applicable to any RS.

A WTRU may be configured with CSI-RS resources. Such CSI-RS resources may overlap guard band resources. Upon reception of a CSI-RS transmission, the WTRU may not be aware of the sets of activated and deactivated guard bands. In such a case, the WTRU may perform multiple CSI-RS measurements. For example, the WTRU may perform different sets of measurements for each possible assumption of sets of activated or deactivated guard bands. At its simplest, the WTRU may perform two sets of measurements, a first set of measurements on the CSI-RS assuming all overlapping guard bands are activated, and a second set of measurements assuming all guard bands are deactivated.

In another embodiment, the WTRU may perform two sets of measurements; a first set of measurements for the subset of CSI-RS resources not overlapped by guard bands, and a second set of measurements for the subset of CSI-RS resources overlapped by guard bands.

The WTRU may feedback measurements for all guard band assumptions or for all subsets of CSI-RS resources. In another embodiment, the WTRU may receive an indication (e.g. between the CSI-RS measurements and the CSI-RS report instance) indicating the actual set of transmitted CSI-RS resources (or the actual sets of activated/deactivated guard bands) and the WTRU may only feedback measurements applicable to the actually transmitted CSI-RS resources. This feedback may be in the form of a report of the measurements of bandwidth parts that include the guard bands of interest.

In another embodiment, the WTRU may be configured with conditional CSI-RS resources mapping to resources overlapped by at least one guard band (e.g. only mapped to resources overlapped by guard bands). In such a case, the WTRU may assume that such CSI-RS are only activated on the condition that the overlapping guard bands are deactivated. Thus, the WTRU may not perform measurements and feedback on CSI-RS resources if overlapping guard bands are activated.

In another embodiment, the WTRU may be indicated (provided information about, defined) the actual resources on which an aperiodic CSI-RS is transmitted (or equivalently, the sets of activated and deactivated guard bands). Such an indication may be provided in the same signal triggering the aperiodic CSI-RS. In another example, the indication may be provided prior to or after the trigger of the aperiodic CSI-RS. For example, the WTRU may be triggered to receive an aperiodic CSI-RS and may receive an indication of the activated or deactivated guard bands after the aperiodic CSI-RS trigger but before the actual transmission of the CSI-RS.

CSI-RS Sequence and Orthogonal Cover Code (OCC) Determination.

CSI-RS resources may be mapped to resources overlapping some guard bands. As such, the CSI-RS resources may not be transmitted on the same sets of Resource Elements (REs) for all CSI-RS transmission instances. The WTRU may determine the mapping of the CSI-RS sequence or the applicable OCC to REs as a function of the sets of activated or deactivated guard bands. For example, the sequence or OCC may only be mapped to resources not overlapping activated guard bands. In another example, the sequence or OCC may be mapped to all resources (e.g. regardless of whether they are overlapped with activated or deactivated guard bands) but the transmission may only occur on resources not overlapped with activated guard bands.

Sounding Reference Signal (SRS) Transmission.

A WTRU may be configured with SRS resources that overlap with guard band resources. The WTRU may only transmit on such overlapped resources if the applicable guard bands are deactivated. The determination of sequence for SRS may reuse the same rules as those described herein for CSI-RS.

For instances where an SRS transmission occurs in a well-established COT (e.g. a COT where there is no ambiguity between the gNB and the WTRU as to which guard bands are activated or deactivated), the WTRU may transmit the SRS using a configured set of parameters and sequence applicable to the set of resources where transmission is possible. On the other hand, for SRS transmissions that require the WTRU to acquire the channel or that occur in a COT where the set of activated and deactivated guard bands still has some ambiguity, the parameters of the SRS may need adaptation. For example, depending on the set of LBT subbands acquired, the WTRU may deactivate certain guard bands (e.g. those occurring at the juncture of two acquired LBT subbands). In such a case, the WTRU may transmit SRS resources occurring on the overlapping deactivated guard band resources. The WTRU may need to indicate to the gNB the set of assumed deactivated guard bands. This may be done by selecting a set of SRS parameters. For example, if the WTRU transmits the SRS on a first set of resources assuming a first set of deactivated guard bands, the WTRU uses a first set of SRS transmission parameters (e.g. sequence). If the WTRU transmits the SRS on a second set of resources assuming a second set of deactivated guard bands, the WTRU uses a second set of SRS transmission parameters.

Demodulation Reference Signal (DM-RS). For DM-RS transmitted with PDSCH or PUSCH, the WTRU may reuse the same rules described herein for the transmission of PUSCH or reception of PDSCH.

For PDCCH DM-RS, the WTRU may determine the presence of a DM-RS based on if the Control Resource Set (CORESET) is present and on which resources the CORESET is present.

In a first embodiment, a CORESET may be present only if all overlapping guard bands are deactivated. In another embodiment, the WTRU may assume that any resources overlapping activated guard bands are simply punctured. In another embodiment, the CORESET may be assumed shifted in frequency to ensure it does not coincide with any activated guard bands.

A search-space configuration may shift a CORESET in frequency. Therefore, the WTRU may determine the appropriate search space configuration (e.g. frequency shift) for a COT based on the set of acquired LBT subbands and the sets of activated and deactivated guard bands. For example, the WTRU may only assume a search-space is active (or a specific frequency shift of the search-space is applicable) of it results in the associated CORESET not overlapping any activated guard band.

Figure 5A:
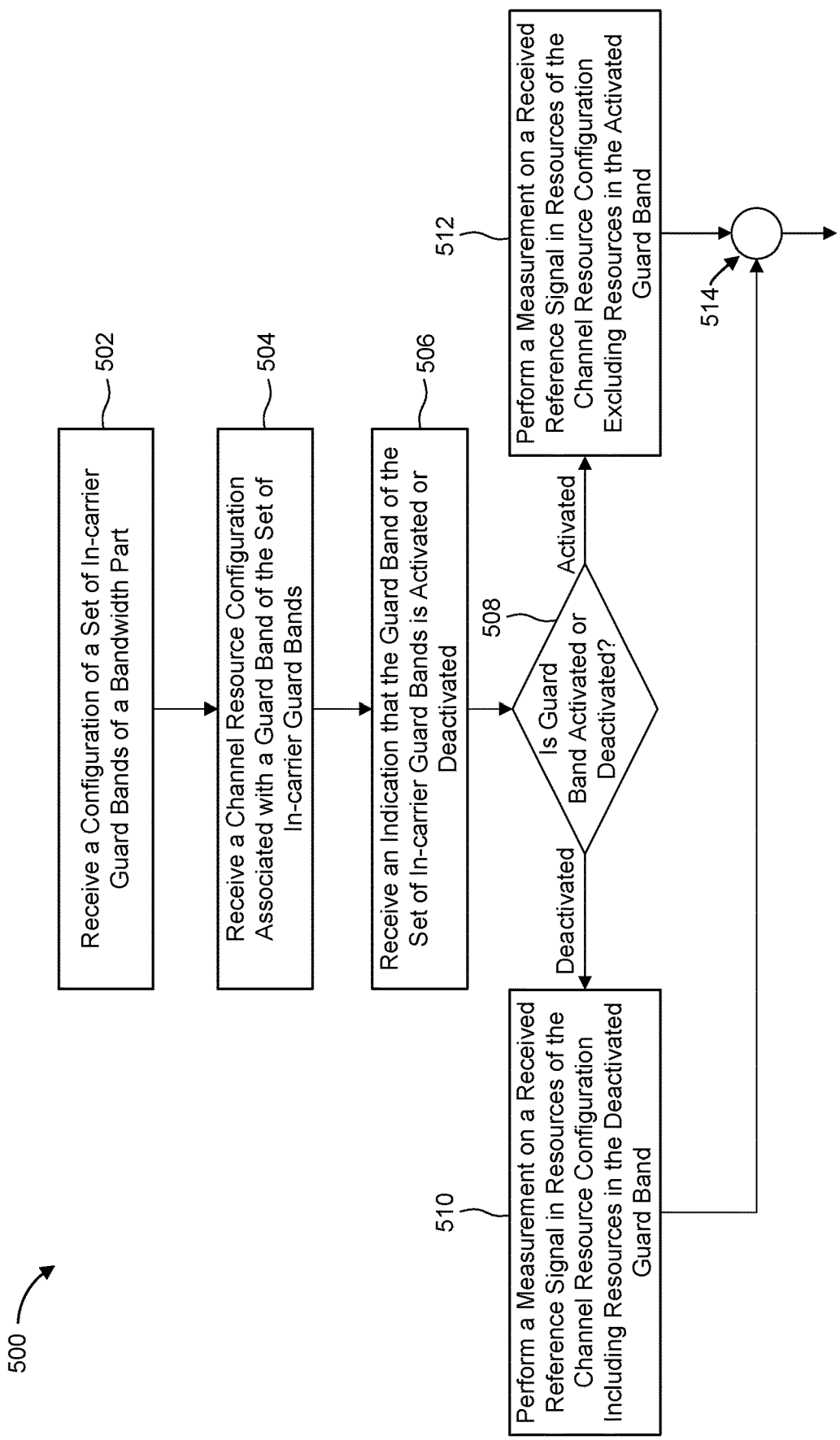
FIG. 5A depicts an example method according to principles of the disclosure.

It should be noted and understood by one of skill in the art that any one or more concepts or aspects presented herein may be combined with any other one or more concepts or aspects unless specifically expressed otherwise. FIG. 5A depicts an example flow diagram of a method 500 performed by a WTRU that combines some concepts or aspects of the teachings presented herein. At block 502 in FIG. 5A, the WTRU may receive a configuration of a set of in-carrier guard bands associated with a bandwidth part. Examples of block 502 reception of a configuration may be reception of a configuration of a set of in-carrier guard bands associated with a bandwidth part as determined by higher layer signaling, such as from a gNB or other network element or entity. For example, the configuration of in-carrier guard bands may be received via one or more RRC messages or one or more MAC-CE messages. One means of receiving a configuration of a set of in-carrier guard bands may be the WTRU receiving one or more messages or signaling that includes in-carrier guard band information. Examples of in-carrier guard band information may include one or more of a size of the in-carrier subband, a position or location of the in-carrier guard band, an indication of the in-carrier guard band being either statically or dynamically configured, activated, or deactivated, a presence of the in-carrier guard band within the COT, a trigger for activation or deactivation, and a beam identifier. Other configuration information not specifically stated herein that may define a configuration of an in-carrier guard band may also be received.

At block 504 of FIG. 5A, the WTRU may receive a channel resource configuration associated with a guard band of the set of in-carrier guard bands. A channel resource configuration may be defined in terms of network topology for the system of interest. For example, in a 3G, 4G, 5G, or proposed 6G network topology terms, a channel resource configuration may have different signaling messages that represents a means for reception of a channel resource configuration. In one example, a WTRU receiving a channel resource configuration associated with a guard band of the set of in-carrier guard bands may include receiving a channel state information reference signal (CSI-RS) resource configuration. Other channel resource configuration for other network topologies may be used as is known to those of skill in the art.

At block 506, the WTRU may receive an indication that the guard band of the set of in-carrier guard bands is activated or deactivated. An indication that the guard band of the set of in-carrier guard bands is activated or deactivated may be received as a result of receiving a message from a network element or entity, such as a gNB. Such a message or set of messages may be a channel occupancy time frequency structure for a set of acquired subbands. Other messages that may provide the WTRU with an indication of activation or deactivation of in-carrier guard bands include one or more of a PDCCH message, a DCI message, a MAC-CE message, a PDSCH message, a PUSCH message, a resource allocation (RA) of a scheduling assignment or grant, a RA mapping to a PRB, and/or a post hoc message that changes a RA for the configured bandwidth part.

At block 508, the WTRU may determine, detect, or be indicated from the received receptions, either implicitly or explicitly, whether a guard band in the set of in-carrier guard bands is deactivated or activated. On condition that the guard band of the set of in-carrier guard bands is deactivated, the method 500 enters block 510. At block 510, the WTRU performs a measurement on at least one received reference signal in resources of the channel resource configuration including resources in the deactivated guard band. Performing a measurement based on a reference signal may be interpreted according to the particular network technology employed. For example, the terminology or technique for performing a measurement may differ based on whether the network technology uses measurements based on 3G, 4G, 5G, or proposed 6G. For example, the measurement may be performed by the WTRU using a channel state information reference signal (CSI-RS) or any other RS. The measurement performed by the WTRU may include any of Channel State Information (CSI), reference signal received power (RSRP), received signal strength indication (RSSI), or any other layer 3 (L3) measurement technique known to those of skill in the art.

Returning to block 508, the WTRU may determine, detect, or be indicated from the received receptions whether a guard band in the set of in-carrier guard bands is deactivated or activated. On condition that the guard band of the set of in-carrier guard bands is activated, the method 500 enters block 512. At block 512, the WTRU performs a measurement on at least one received reference signal in resources of the channel resource configuration excluding resources in the activated guard band. As described above with respect to the measurement of block 510, the measurement of block 512 may be performed by the WTRU using a channel state information reference signal (CSI-RS) or any other RS. The measurement performed by the WTRU may include any of Channel State Information (CSI), reference signal received power (RSRP), received signal strength indication (RSSI), or any other layer 3 (L3) measurement technique known to those of skill in the art.

Figure 5B:
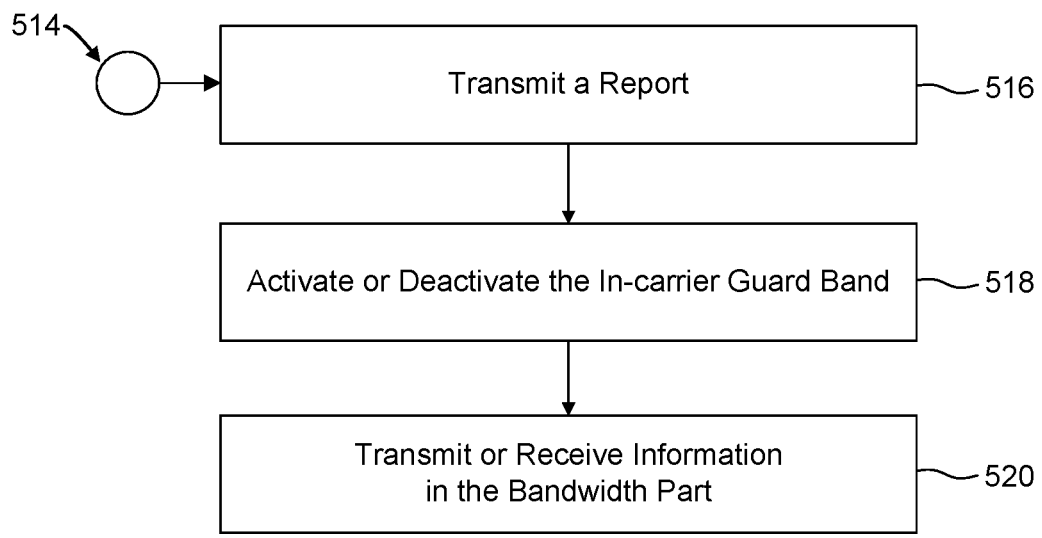
FIG. 5B depicts some continuing elements of the FIG. 5A method.

After the measurements of blocks 510 or 512 are made, the WTRU may continue via node 514 of FIG. 5A and FIG. 5B to block 516. At block 516 the WTRU may optionally send a report, based on the measurements made in either block 510 or 512 or any other channel measurements, back to the network to inform the network of channel conditions in the bandwidth part of interest upon which the measurements were made. In the example of FIG. 5B, in block 518, the WTRU may activate or deactivate the in-carrier guard band in accordance with the received information to activate or deactivate an in-carrier guard band. At block 520, the WTRU can then receive or transmit information in the bandwidth part affected by an activation or deactivation of an in-carrier guard bands within a bandwidth part. This action may occur within a time duration of a COT. In the example of FIG. 2, where in-carrier guard bands in the boundaries of 204 LBT subband 2 and 206 LBT subband 3 are deactivated, then the WTRU can utilize the subband 2 and subband 3 to receive or transmits information via the network.

Using the FIG. 2 example, and applying the method 500 of FIG. 5A and FIG. 5B, at block 506, a WTRU may receive an indication that the guard band of the set of in-carrier guard bands is activated or deactivated may be a WTRU receiving information relating to a deactivation of at least one in-carrier guard band between adjacent subbands in the bandwidth part. The WTRU may then act to deactivate the at least one in-carrier guard band at for example, block 518. Such a deactivation is depicted in FIG. 2 as between subbands 2 and 3. Following that action, the WTRU may then transmit or receive information in the adjacent subbands at block 520 within a time limit of a COT. This is shown in FIG. 2 as the availability of the deactivated subbands 2-3 for WTRU use between time points 212 and 214 within the COT.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, the terms "user equipment" and its abbreviation "UE", and the term "remote" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iv) a wireless-capable and/or wired-capable device configured with less than all structures and functionality of a WTRU; or (v) the like. Details of an example WTRU, which may be representative of any WTRU recited herein, are provided herein with respect to FIGS. 1A-1D.

In addition, the methods or embodiments provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the methods, apparatuses and systems provided above are possible without departing from the scope of the invention. In view of the wide variety of embodiments that can be applied, it should be understood that the illustrated embodiments are examples only, and should not be taken as limiting the scope of the following claims. Rather, various modifications may be made in the details within the scope and range of equivalents of the claims and without departing from the invention.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM")) or non-volatile (e.g., Read-Only Memory (ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

What is claimed:

1. A method, performed by a wireless transmit receive unit, WTRU, the method comprising:
    receiving an indication of a configuration of a set of guard bands associated with a bandwidth part;
    receiving an indication of a channel resource configuration associated with at least one guard band of the set of guard bands;
    performing a first measurement on at least one received reference signal in resources of the channel resource configuration excluding resources in an activated guard band;
    receiving an indication that a guard band of the at least one guard band is deactivated; and
    performing a second measurement on at least one received reference signal in resources of the channel resource configuration including resources in the deactivated guard band.

2. The method of claim 1, further comprising:
transmitting at least one report of measurement information based on the first or second measurement on at least one received reference signal.

3. The method of claim 1, further comprising:
activating or deactivating the at least one guard band of the set of guard bands; and
transmitting or receiving information in the deactivated guard band of the bandwidth part that is affected by the activation or deactivation of the at least one guard band.

4. The method of claim 3, wherein transmitting or receiving information in the deactivated guard band of the bandwidth part occurs within a channel occupancy time.

5. The method of claim 1, wherein receiving the configuration of a set of guard bands associated with a bandwidth part is established by higher layer signaling.

6. The method of claim 1, wherein receiving the indication that the guard band of the at least one guard band is deactivated, comprises receiving any of:
a channel occupancy time frequency structure for a set of acquired subbands;
an information element in a physical downlink control channel, PDCCH transmission;
a physical downlink control channel transmission;
downlink control information;
a medium access control-control element;
an information element in a physical downlink shared channel transmission;
a physical downlink shared channel transmission;
a resource allocation, RA, of a scheduling assignment or grant;
a RA mapping to a physical resource block; or
a later-received message that changes a RA for the bandwidth part.

7. The method of claim 1, wherein receiving the configuration of a set of guard bands associated with a bandwidth part comprises receiving information regarding any of:
a size of a guard band of the set of guard bands;
a position or location of the guard band;
an indication of the guard band being any of: statically configured, dynamically configured, activated, or deactivated;
a presence of the guard band within a channel occupancy time;
a trigger for activation or deactivation of the guard band; or
a beam identifier.

8. The method of claim 1, wherein receiving the indication of the channel resource configuration associated with at least one guard band of the set of guard bands comprises receiving a channel state information reference signal resource configuration.

9. A wireless transmit/receive unit, WTRU, comprising:
a transceiver and processor configured to:
receive an indication of a configuration of a set of guard bands associated with a bandwidth part;
receive an indication of a channel resource configuration associated with at least one guard band of the set of guard bands;
perform a first measurement on at least one received reference signal in resources of the channel resource configuration excluding resources in an activated guard band;
receive an indication that the guard band of the at least one guard band is deactivated; and
perform a second measurement on the at least one received reference signal in resources of the channel resource configuration including resources in the at least one deactivated guard band.

10. The WTRU of claim 9, wherein the processor is further configured to transmit at least one report of measurement information based on the first or second measurement on at least one received reference signal.

11. The WTRU of claim 9, wherein:
the processor is further configured to activate or deactivate the at least one guard band; and
the transceiver is further configured to transmit or receive information in the deactivated guard band of the bandwidth part that is affected by the activation or deactivation of the at least one guard band.

12. The WTRU of claim 11, wherein the transceiver transmits or receives information in the deactivated guard band of the bandwidth part that is affected by the activation or deactivation of the at least one guard band within a channel occupancy time.

13. The WTRU of claim 9, wherein the transceiver received configuration of a set of guard bands associated with a bandwidth part is established by higher layer signaling.

14. The WTRU of claim 9, wherein the transceiver receives an indication that the guard band of the at least one guard band is deactivated comprises the transceiver receiving any of:
a channel occupancy time frequency structure for a set of acquired subbands;
an information element in a physical downlink control channel transmission;
a physical downlink control channel transmission;
a downlink control information element;
a medium access control-control element;
an information element in a physical downlink shared channel transmission;
a physical downlink shared channel transmission;
a resource allocation, RA, of a scheduling assignment or grant;
a RA mapping to a physical resource block; or
a later-received message that changes a RA for the bandwidth part.

15. The WTRU of claim 14, wherein the transceiver receiving a later-received message that changes the RA of the bandwidth part subsequently enables demodulation of information previously received in the bandwidth part before reception of the later-received message.

16. The WTRU of claim 9, wherein the transceiver receives the configuration of the set of guard bands associated with a bandwidth part comprises receiving information regarding any of:
a size of a guard band in the set of guard bands;
a position or location of the guard band;
an indication of the guard band being statically configured, dynamically configured, activated, or deactivated;
a presence of the guard band within a channel occupancy time;
a trigger for activation or deactivation of the guard band; or
a beam identifier.

17. The WTRU of claim 9, wherein the transceiver is configured to receive the channel resource configuration associated with at least one guard band comprises the transceiver configured to receive a channel state information reference signal resource configuration.

18. A non-transient computer readable storage medium comprising instructions which when executed by a computer cause the computer to carry out the method of:
- receiving an indication of a configuration of a set of guard bands associated with a bandwidth part;
- receiving an indication of a channel resource configuration associated with at least one guard band of the set of guard bands;
- performing a first measurement on the at least one received reference signal in resources of the channel resource configuration excluding resources in an activated guard band;
- receiving an indication that a guard band of the at least one guard band is deactivated; and
- performing a second measurement on the at least one received reference signal in resources of the channel resource configuration including resources in the at least one deactivated guard band.

19. The non-transient computer readable storage medium on claim 18, further comprising:
- transmitting at least one report of measurement information based on the first or second measurement on the at least one received reference signal.

20. The non-transient computer readable storage medium on claim 18, further comprising:
- activating or deactivating the at least one guard band of the set of guard bands; and
- transmitting or receiving information in the deactivated guard band of the bandwidth part that is affected by the activation or deactivation of the at least one guard band.

* * * * *